United States Patent [19]

Bly et al.

[11] Patent Number: 4,965,447

[45] Date of Patent: Oct. 23, 1990

[54] CHOPPER FOR STARING INFRARED SYSTEMS

[75] Inventors: Vincent T. Bly, Springfield; Conrad W. Terrill, Lorton; Donna J. Advena, Springfield, all of Va.

[73] Assignee: The United States of America as represented by the Secretary of the Army, Washington, D.C.

[21] Appl. No.: 225,410

[22] Filed: Jul. 28, 1988

[51] Int. Cl.⁵ .............................................. G01D 5/36
[52] U.S. Cl. ..................................... 250/233; 250/330
[58] Field of Search ............... 250/330, 332, 333, 334, 250/237 R, 232, 238; 350/162.21, 162.22

[56] References Cited

U.S. PATENT DOCUMENTS 4,322,620  3/1982  Steinhage .......................... 250/330
4,814,602  3/1989  Imura ................................. 250/233

Primary Examiner—David C. Nelms
Attorney, Agent, or Firm—Milton W. Lee; Aubrey J. Dunn; Anthony T. Lane

[57] ABSTRACT

Incident infrared radiation is focussed through a rotatable disk of germanium onto a detector array. The disk has a thickness many times the wavelengths of the incident radiation and is partly covered with a pattern of germanium one-half wavelength of some preselected wavelength of the incident radiation. The pattern is a regular array of mesas, and acts as a phase grating which diffracts incident radiation. The diffracted (or blurred) image on the detector array is used as a reference level for background suppression.

3 Claims, 2 Drawing Sheets

CHOPPER FOR STARING INFRARED SYSTEMS

The invention described herein may be manufactured, used, and licensed by the U.S. Government for governmental purposes without the payment of any royalties thereon.

BACKGROUND OF INVENTION

This invention is in the field of mechanically rotating choppers for electromagnetic radiation, and is particularly concerned with a chopper for use with a staring array of infrared detectors. In order to suppress background radiation in scanned infrared detecting systems, AC coupling is used. For staring arrays, however, some other method must be used. Most uncooled staring systems use a chopper that alternately provides a sharply focussed image and a blurred or scattered image as a background reference. Each detector of the array is thus alternately exposed to radiation from a specific point in the scene and radiation proportional to the local background radiation level. The algebraic difference between the alternate radiations (images) is the scene with background suppressed. The currently used choppers are made of a material transparent to infrared radiation (such as germanium) and are in the form of disks with open portion If the infrared scene is focussed by a fast objective lens onto the detector array through the open portions of the chopper, it will be out of focus when passing through the closed portions because of the optical thickness of the disk and the shallow depth of focus of the objective lens. While this type of chopper works well, it has disadvantages which the present invention overcomes. Specifically, the disk is expensive to make, and is very fragile.

SUMMARY OF THE INVENTION

The invention is a chopper for infrared radiation focussed onto a staring array of infrared detectors. The chopper is in the form of a disk transparent to infrared radiation and interposed between the focussing lens and the array. Portions of the disk are coated with a material also transparent to infrared radiation, but with a thickness one-half wavelength of the infrared radiation, such that radiation through these portions is diffracted.

DETAILED DESCRIPTION

Figure 1:
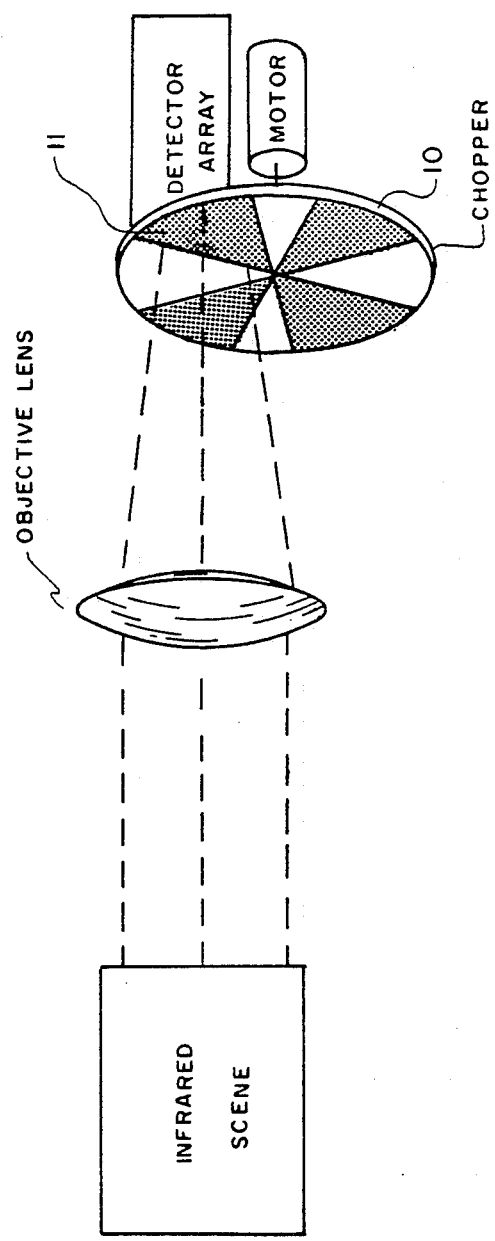
FIG. 1 is a schematic/pictoral showing of the system in which the inventive chopper is used.

Looking at FIG. 1, we see a system in which the instant invention is used. This system consists of an objective lens or its equivalent which gathers radiation from an infrared scene and which focusses it through a motor-driven chopper onto a detector array. The novelty resides in the chopper itself. In the preferred embodiment, the chopper is in the form of a disk 10 of material transparent to infrared radiation, such as germanium. In particular, we use pressed polycrystalline germanium, although other solids transparent to infrared radiation, such as CVD (Chemically Vapor Deposited) ZnSe may be used. The chopper disk is partially covered with a thin-layer pattern 11 which serves the purpose of blurring or defocussing the image from the objective lens by diffraction. The particular pattern shown is cruciform and is a phase grating consisting of an approximately half-wavelength thick (for some median or other wavelength of the infrared spectrum being detected) and transparent film deposited as an array of uniformly spaced and sized mesas.

Figure 2:
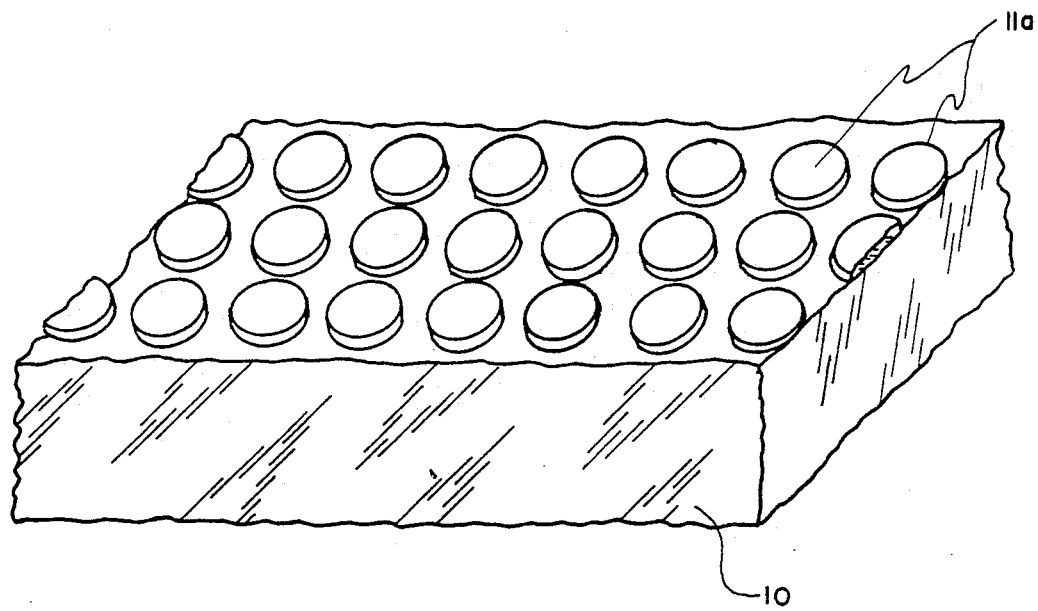
FIG. 2 is a magnified section of the FIG. 1 chopper.

Turning now to FIG. 2, we see a highly-magnified (and not to scale) section of the chopper. On disk 10 a portion of pattern 11 is shown as round mesas 11a in a regular array such that the total area covered by the mesas is (ideally) equal to the area not so covered. For a design wavelength of 9.5 $\mu$m, the mesa thickness in Germanium is 1.58 $\mu$m. The preferred mesa material is photolithographically deposited germanium with typical mesa diameters is the range from 40 to 150 $\mu$m.

Figure 3:
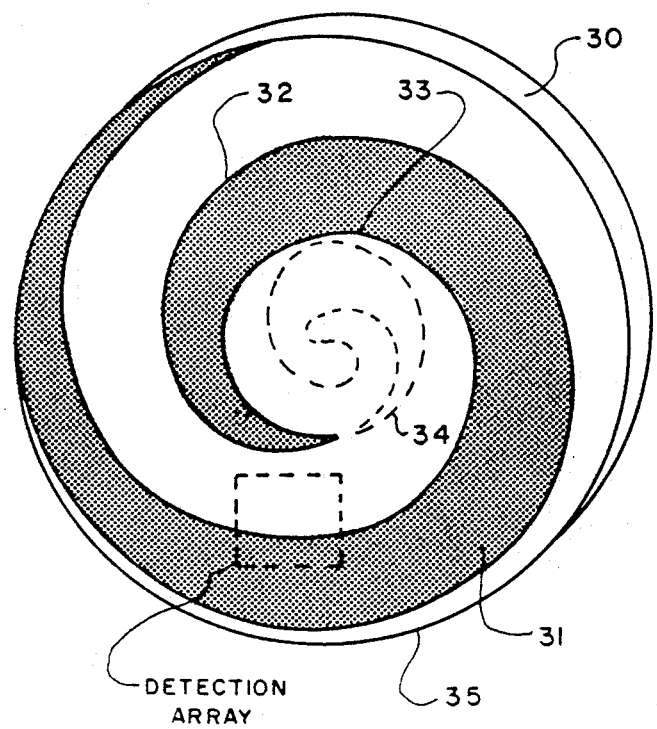
FIG. 3 is a pictoral view of an alternate chopper from the one included in FIG. 1.

FIG. 3 shows the preferred chopper disk pattern for a chopper which can be used as a scanner for a two-dimensional detection array shown as a rectangle behind the chopper. This chopper consists of disk 30 with pattern 31 thereon. The pattern is defined by two archimedian spirals 32 and 33 with a common origin but starting 180° apart, by an inner circle 34, and by an outer circle 35, with both circles concentric to the origin of the spirals. The sizes of the spirals and circles are such that the pattern, at its widest part, overlaps the array both top and bottom, in order to account for converging radiation rays shown in FIG. 1. As in FIG. 2, the pattern is an array of round mesas, etc.

Because of the thickness of the chopper (mesa) patterns, and the mesa size and spacing and the indices of refraction of the mesas and the disk, an optical path difference is obtained that effectively gives a blurred image for background suppression, as discussed above in the Background of the Invention.

Although we have described our invention as being a pattern on or atop the disk, it could obviously be in the form of intagliations in the disk surface, made by photolithography or other means. Moreover, the mesas need not be round as shown and described; other shapes, such as squares and regular hexagons may be used. In any event, the mesas form a regular array which cover an area ideally equal to the uncovered area of the substrate.

We claim:

1. An improved chopper for a detector array of a narrow band of electromagnetic radiation, wherein the chopper is in the form of a disk adjacent to said detector and whose thickness is many times the wavelengths of radiation in said band and which is tranparent to said radiation and which is partially covered with a pattern on one side, wherein said pattern has an optical thickness of one-half wavelength for a particular one of said wavelengths and is transparent to said radiation, wherein the disk is rotatable about an axis parallel to the optical path between said radiation and said detector to alternately interpose its pattern covered and uncovered portions in said optical path.

2. The chopper as set forth in claim 1 wherein said band is for infrared, and said disk and pattern are germanium.

3. The chopper as set forth in claim 1 wherein said pattern is in the area between two archemidian spirals.

* * * * *